US012682280B2

(12) United States Patent
Xu et al.

(10) Patent No.: US 12,682,280 B2
(45) **Date of Patent: \*Jul. 14, 2026**

(54) IDENTIFYING OPTIMAL WEIGHTS TO IMPROVE PREDICTION ACCURACY IN MACHINE LEARNING TECHNIQUES

(71) Applicant: Anthropic, PBC, San Francisco, CA (US)

(72) Inventors: Jing Xu, Xi'an (CN); Si Er Han, Xi'an (CN); Steven George Barbee, Amenia, NY (US); Xue Ying Zhang, Xi'an (CN); Ji Hui Yang, Beijing (CN)

(73) Assignee: Anthropic, PBC, San Francisco, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/827,495

(22) Filed: May 27, 2022

(65) Prior Publication Data

US 2022/0292401 A1 Sep. 15, 2022

Related U.S. Application Data

(63) Continuation of application No. 16/684,396, filed on Nov. 14, 2019, now Pat. No. 11,443,235.

(51) Int. Cl.
*G06F 15/16* (2006.01)
*G06F 9/54* (2006.01)
(Continued)

(52) U.S. Cl.
CPC ............... *G06N 20/00* (2019.01); *G06N 5/02* (2013.01)

(58) Field of Classification Search
CPC ................................ G06N 20/00; G06N 5/02
(Continued)

(56) References Cited

U.S. PATENT DOCUMENTS

| | | | |
|---|---|---|---|
| 10,257,072 B1 | 4/2019 | Salam | |
| 10,318,882 B2 * | 6/2019 | Brueckner | ............. G06N 20/00 |

(Continued)

FOREIGN PATENT DOCUMENTS

| | | |
|---|---|---|
| CN | 110175628 A | 8/2019 |
| JP | 2018151950 A | 9/2018 |
| JP | 2019046422 A | 3/2019 |

OTHER PUBLICATIONS

Examination Report from United Kingdom Intellectual Property Office for Application No. GB2207662.4 dated Jun. 22, 2022, pp. 1-10.

(Continued)

*Primary Examiner* — Hamza N Algibhah
(74) *Attorney, Agent, or Firm* — Haynes and Boone, LLP

(57) ABSTRACT

A computer-implemented method, system and computer program product for improving prediction accuracy in machine learning techniques. A teacher model is constructed, where the teacher model generates a weight for each data case. The current student model is then trained using training data and the weights generated by the teacher model. After training the current student model, the current student model generates state features, which are used by the teacher model to generate new weights. A candidate student model is then trained using training data and these new weights. A reward is generated by comparing the current student model with the candidate student model using training and testing data, which is used to update the teacher model if a stopping rule has not been satisfied. Upon a stopping rule being satisfied, the weights generated by the teacher model are deemed to be the "optimal" weights which are returned to the user.

20 Claims, 5 Drawing Sheets

(51) Int. Cl.
  *G06N 5/02*      (2023.01)
  *G06N 20/00*      (2019.01)
  *H04L 29/06*      (2006.01)

(58) Field of Classification Search
  USPC ........................................................ 706/12
  See application file for complete search history.

(56)             References Cited

U.S. PATENT DOCUMENTS

| | | | |
|---|---|---|---|
| 10,768,583 B2 | 9/2020 | Fuji et al. | |
| 11,132,602 B1 * | 9/2021 | Xie | G06F 9/44552 |
| 11,276,023 B1 * | 3/2022 | Butler | G06N 20/00 |
| 2009/0210371 A1 * | 8/2009 | Laan | G06F 18/254 |
| | | | 706/21 |
| 2016/0071017 A1 | 3/2016 | Adjaoute | |
| 2016/0078361 A1 * | 3/2016 | Brueckner | H04L 67/10 |
| | | | 706/12 |
| 2017/0083829 A1 * | 3/2017 | Kang | G06N 3/045 |
| 2017/0132528 A1 | 5/2017 | Aslan et al. | |
| 2017/0372201 A1 | 12/2017 | Gupta et al. | |
| 2018/0268280 A1 | 9/2018 | Tokuchi | |
| 2018/0314947 A1 * | 11/2018 | Morris, II | G06N 20/20 |
| 2019/0102693 A1 * | 4/2019 | Yates | G06N 20/00 |
| 2019/0102709 A1 * | 4/2019 | Correa | G06Q 10/02 |
| 2019/0156205 A1 | 5/2019 | Gebre et al. | |
| 2019/0164110 A1 | 5/2019 | Shiraishi | |
| 2019/0205748 A1 | 7/2019 | Fukuda et al. | |
| 2019/0287515 A1 * | 9/2019 | Li | G06N 3/084 |
| 2020/0134445 A1 * | 4/2020 | Che | G06N 3/044 |
| 2020/0134759 A1 * | 4/2020 | Refila | G06Q 50/2053 |
| 2020/0209858 A1 * | 7/2020 | Trofymov | G05D 1/0246 |
| 2020/0218940 A1 * | 7/2020 | Anglin | H04L 9/0637 |
| 2020/0225385 A1 * | 7/2020 | O'Donncha | G01W 1/10 |
| 2020/0257980 A1 * | 8/2020 | Bhattacharjee | G06F 17/11 |
| 2020/0302334 A1 * | 9/2020 | Yang | G06N 20/00 |
| 2020/0334538 A1 * | 10/2020 | Meng | G10L 15/16 |
| 2020/0364502 A1 | 11/2020 | Anping et al. | |
| 2020/0401949 A1 * | 12/2020 | Dangi | G06N 20/00 |
| 2021/0117776 A1 * | 4/2021 | Cheng | G06N 20/00 |
| 2021/0142208 A1 * | 5/2021 | Osogami | G06N 20/00 |
| 2022/0366678 A1 * | 11/2022 | Ishii | G06T 7/73 |
| 2023/0119593 A1 * | 4/2023 | Yao | G06V 10/774 |
| | | | 382/118 |

OTHER PUBLICATIONS

Fan et al., "Learning to Teach," Sixth International Conference on Learning Representations, Apr. 30-May 3, 2018, pp. 1-16.

Freund et al., "A Decision-Theoretic Generalization of On-Line Learning and an Application to Boosting," Journal of Computer and System Sciences, vol. 55, 1997, pp. 119-139.

Ronald J. Williams, "Simple Statistical Gradient-Following Algorithms for Connectionist Reinforcement Learning," Machine Learning, vol. 8, 1992, pp. 229-256.

Kim et al., "A Weight-Adjusted Voting Algorithm for Ensemble of Classifiers," Journal of the Korean Statistical Society, vol. 40, Issue 4, Dec. 2011, pp. 437-449.

Kuhn et al., "Applied Predictive Modeling," "Chapter 14: Classification Trees and Rule-Based Models," Springer Science+Business Media, New York, 2013, pp. 369-413.

International Search Report and the Written Opinion of the International Searching Authority for International Application No. PCT/IB2020/060581 dated Feb. 23, 2021, pp. 1-10.

Notice of Acceptance of Patent Application for Australian Application No. 2020385049 dated Jan. 16, 2023, pp. 1-3.

Examination Report for United Kingdom Application No. GB2207662.4 dated Sep. 2, 2022, pp. 1-6.

List of IBM Patents or Patent Applications Treated as Related, Jul. 17, 2022, pp. 1-2.

Decision to Grant a Patent for Japanese Patent Application No. 2022-525521 dated Mar. 18, 2204, pp. 1-2.

Search Report mailed Jun. 3, 2025, in Singapore Patent Application No. 11202204720U, filed Nov. 10, 2020.

* cited by examiner

| PREDICTOR | WEIGHT | PREDICTED VALUE |
|-----------|--------|-----------------|
| ... | ... | ... |
| ... | ... | ... |

*401 · 402 · 403*

600

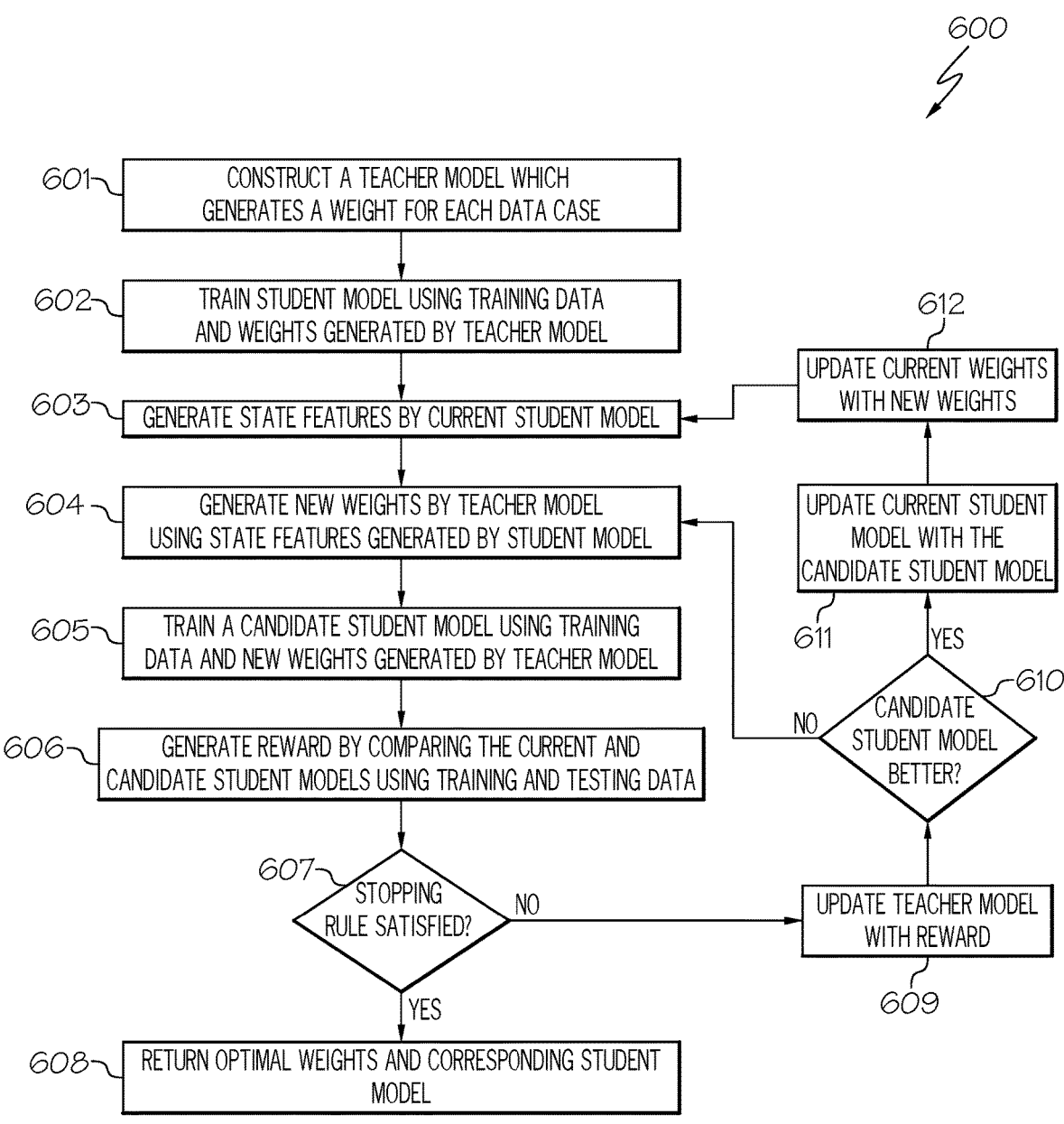

601 — CONSTRUCT A TEACHER MODEL WHICH GENERATES A WEIGHT FOR EACH DATA CASE

602 — TRAIN STUDENT MODEL USING TRAINING DATA AND WEIGHTS GENERATED BY TEACHER MODEL

603 — GENERATE STATE FEATURES BY CURRENT STUDENT MODEL

604 — GENERATE NEW WEIGHTS BY TEACHER MODEL USING STATE FEATURES GENERATED BY STUDENT MODEL

605 — TRAIN A CANDIDATE STUDENT MODEL USING TRAINING DATA AND NEW WEIGHTS GENERATED BY TEACHER MODEL

606 — GENERATE REWARD BY COMPARING THE CURRENT AND CANDIDATE STUDENT MODELS USING TRAINING AND TESTING DATA

607 — STOPPING RULE SATISFIED?

NO

608 — RETURN OPTIMAL WEIGHTS AND CORRESPONDING STUDENT MODEL

YES

609 — UPDATE TEACHER MODEL WITH REWARD

610 — CANDIDATE STUDENT MODEL BETTER?

NO

YES

611 — UPDATE CURRENT STUDENT MODEL WITH THE CANDIDATE STUDENT MODEL

612 — UPDATE CURRENT WEIGHTS WITH NEW WEIGHTS

FIG. 6

IDENTIFYING OPTIMAL WEIGHTS TO IMPROVE PREDICTION ACCURACY IN MACHINE LEARNING TECHNIQUES

TECHNICAL FIELD

The present invention relates generally to predictive modeling, and more particularly to identifying optimal weights to improve prediction accuracy in machine learning techniques.

BACKGROUND

Predictive modeling uses statistics to predict outcomes. Most often the event one wants to predict is in the future, but predictive modelling can be applied to any type of unknown event, regardless of when it occurred. For example, predictive models are often used to detect events and identify persons related to the events, after the events have taken place.

In many cases, the model is chosen on the basis of detection theory to try to guess the probability of an outcome given a set amount of input data, for example, given an email determining how likely that it is spam.

Models can use one or more classifiers in trying to determine the probability of a set of data belonging to another set. For example, a model might be used to determine whether an email is spam or "ham" (non-spam).

Depending on definitional boundaries, predictive modelling is synonymous with, or largely overlapping with, the field of machine learning, as it is more commonly referred to in academic or research and development contexts. When deployed commercially, predictive modelling is often referred to as predictive analytics.

Achieving better predictive models is an objective in the research and practice of machine learning techniques. For example, ensemble methods use multiple learning algorithms to obtain better predictive performance than could be obtained from any of the constituent learning algorithms alone. Such ensemble methods include bootstrap aggregating (also called bagging), boosting, etc.

Bootstrap aggregating is a machine learning ensemble meta-algorithm designed to improve the stability and accuracy of machine learning algorithms used in statistical classification and regression. Boosting is a machine learning ensemble meta-algorithm for primarily reducing bias and also variance in supervised learning and a family of machine learning algorithms that convert weak learners to strong ones.

In such techniques, such as boosting, the weights of wrongly classified cases are increased while the weights of correctly classified cases are decreased during the modeling process. Such a strategy (heuristic) does achieve better predictions in many cases; however, overfitting outliers/noises is a possibility. As a result of overfitting outliers/noises, the predictive accuracy is lessened.

Hence, the heuristic strategy of increasing the weights of wrongly classified cases and decreasing the weights of correctly classified cases may not be the best strategy for improving the prediction accuracy of the model.

For example, sometimes, it may be better to increase the weights of correctly classified cases because such cases contain very important patterns which should be learned by the machine learning algorithm. It may also be better to decrease the weights of wrongly classified cases, such as outlier cases, for similar reasons.

Consequently, such techniques, such as boosting, fail to identify the optimal weights for the classified cases, and therefore, fail to achieve optimal prediction accuracy in machine learning techniques.

SUMMARY

In one embodiment of the present invention, a computer-implemented method for improving prediction accuracy in machine learning techniques comprises training a current student model using training data and weights generated by a teacher model. The method further comprises generating new weights by the teacher model using state features. The method additionally comprises training a candidate student model using the training data and the new weights. Furthermore, the method comprises generating a reward by comparing the current student model with the candidate student model using the training data and testing data to determine which is better at predicting an observed target. Additionally, the method comprises returning the new weights and the current student model to a user in response to a stopping rule being satisfied, where the returned student model provides a prediction of the observed target.

In another embodiment of the present invention, a computer program product for improving prediction accuracy in machine learning techniques, the computer program product comprising one or more computer readable storage mediums having program code embodied therewith, the program code comprising programming instructions for training a current student model using training data and weights generated by a teacher model. The program code further comprises generating new weights by the teacher model using state features. The program code additionally comprises training a candidate student model using the training data and the new weights. Furthermore, the program code comprises generating a reward by comparing the current student model with the candidate student model using the training data and testing data to determine which is better at predicting an observed target. Additionally, the program code comprises returning the new weights and the current student model to a user in response to a stopping rule being satisfied, where the returned student model provides a prediction of the observed target.

In a further embodiment of the present invention, a system comprises a memory for storing a computer program for improving prediction accuracy in machine learning techniques and a processor connected to the memory, where the processor is configured to execute program instructions of the computer program comprising training a current student model using training data and weights generated by a teacher model. The program instructions of the computer program further comprise generating new weights by the teacher model using state features. The program instructions of the computer program additionally comprise training a candidate student model using the training data and the new weights. Furthermore, the program instructions of the computer program comprise generating a reward by comparing the current student model with the candidate student model using the training data and testing data to determine which is better at predicting an observed target. Additionally, the program instructions of the computer program comprise returning the new weights and the current student model to a user in response to a stopping rule being satisfied, where the returned student model provides a prediction of the observed target.

In this manner, the present invention devises a framework which implements the concept of "learning to teach" in the field of predictive modeling. Such a framework includes a teacher model, which generates a weight for each data case. The training data cases, along with the generated weights, are used to re-train the student model. A reward is returned by evaluating the trained student model on a held-out dataset (testing data) in terms of prediction accuracy. The teacher model then utilizes the reward to update its parameters via policy gradient methods, e.g., reinforcement learning. Such a process will be repeated until the student model achieves desired performance.

In comparison to previously used heuristic methods (e.g., boosting), the approach of the present invention determines case weights in an optimal way. This allows one to build a better student model via basic learners, e.g., decision tree, neural network, etc., rather than using an ensemble model.

By using case weights as actions on the student model, any type of machine learner may be used as the student model given that the learner supports case weights in training.

Furthermore, the distributions of data cases in the training data can be corrected by the generated weights in the event that the training data comes from a biased sampling.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 6 is a flowchart of a method for improving prediction accuracy in machine learning techniques in accordance with an embodiment of the present invention.

DETAILED DESCRIPTION

Figure 1:
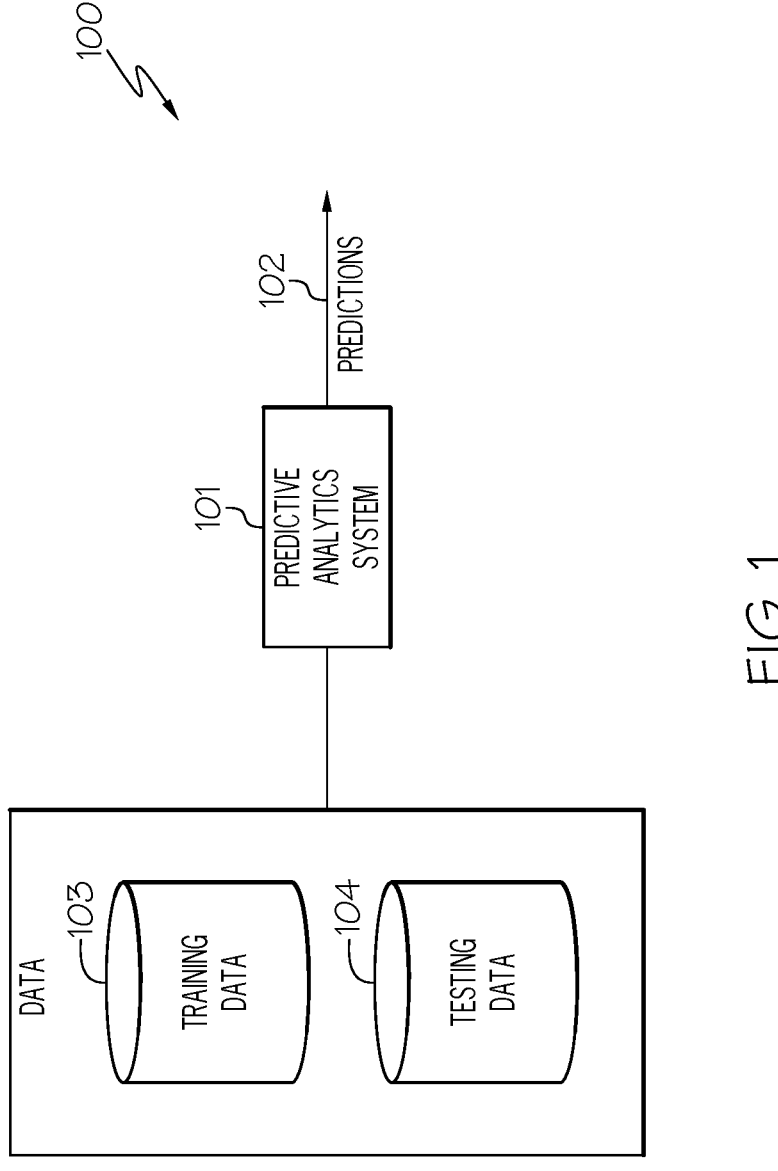
FIG. 1 illustrates a communication system for practicing the principles of the present invention in accordance with an embodiment of the present invention.

The present invention comprises a computer-implemented method, system and computer program product for improving prediction accuracy in machine learning techniques. In one embodiment of the present invention, a teacher model is constructed, where the teacher model generates a weight for each data case. A "teacher model," as used herein, refers to a statistical model that determines the appropriate data, loss function and hypothesis space to facilitate the learning of the student model. The current student model is then trained using training data and the weights generated by the teacher model. A "student model," as used herein, refers to a statistical model that is trained to provide a prediction using training data. A "current" student model, as used herein, refers to a student model currently being trained to provide a prediction using training data. The current student model generates state features (e.g., data features, case weights, student model features and features to represent the combination of both the data and the student model), which are used by the teacher model to generate new weights. A candidate student model is then trained using training data and these new weights. A "candidate student model," as used herein, refers to a student model that is being examined to determine if is a better student model (better at predicting the observed target) than the current student model. A reward is then generated by comparing the current student model with the candidate student model using training and testing data to determine which is better at predicting an observed target. A "reward," as used herein, refers to a value generated by a function (reward function) used in reinforcement learning. A positive reward may be returned if the candidate student model is better at predicting the observed target than the current student model. Conversely, a negative reward may be returned if the current student model is better at predicting the observed target than the candidate student model. The teacher model is then updated with the reward. The teacher model utilizes the rewards to update its parameters via policy gradient methods, such as reinforcement learning. If the candidate student model is better at predicting the observed target than the current student model, then the current student model is updated with the candidate student model and the current weights are updated with the new weights generated by the teacher model. Upon updating the current weights with the new weights, the current student model generates new state features. If, however, the candidate student model is not better at predicting the observed target than the current student model, then the updated teacher model generates new weights using the current weights and the current student features from the current student model. Upon any of the stopping rules being satisfied (e.g., reaching a specified number of trials, reaching a specified training timing, converging of a prediction accuracy and a user-initiated termination), the weights generated by the teacher model are deemed to be the "optimal" weights which are returned to the user along with the corresponding student model. In this manner, optimal weights are identified to improve prediction accuracy.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a communication system 100 for making predictions using machine learning techniques. In one embodiment, system 100 includes a predictive analytics system 101 for generating predictions 102 using data, such as training data 103 and testing data 104 (also referred to herein as "hold-out data").

A further description of predictive analytics system 101 using training and testing data 103, 104 to make predictions is discussed further below in connection with FIGS. 3-6.

In one embodiment, predictive analytics system 101 makes predictions about unknown future events using many techniques from data mining, statistics, modeling, machine learning and artificial intelligence to analyze current data to make predictions about the future.

In one embodiment, predictive analytics system 101 utilizes the concept of "learning to teach," which involves two intelligent agents, namely, a teacher model and a student model. The training phase contains several episodes of sequential interactions between the teacher model and the student model. Based on the state information generated by the student model, the teacher model updates its teaching actions so as to refine the machine learning problem of the student model. The student model then performs its learning process based on the inputs from the teacher model and provides reward signals (e.g., the accuracy on the training data) back to the teacher model afterwards. The teacher model then utilizes such rewards to update its parameters via policy gradient methods, which are a type of a reinforcement learning technique. This interactive process is end-to-end trainable, exempt from the limitations of human-defined heuristics. In one embodiment, the concept of "learning to teach" is implemented by devising an approach of leveraging the weights of cases (data cases) as actions for the student model. A description of the hardware configuration of predictive analytics system 101 is provided below in connection with FIG. 2.

Figure 2:
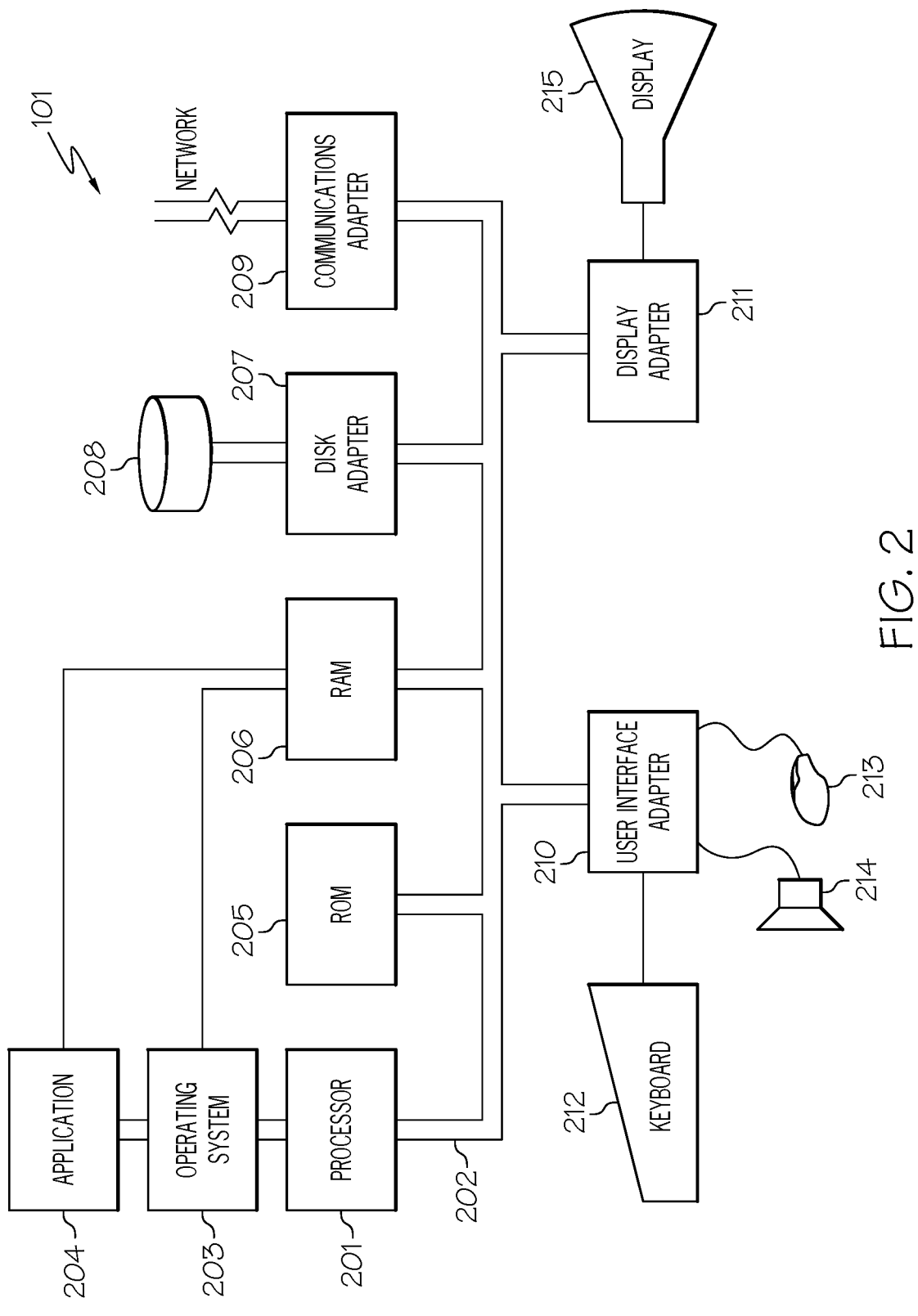
FIG. 2 illustrates an embodiment of the present invention of the hardware configuration of a predictive analytics system which is representative of a hardware environment for practicing the present invention.

Referring now to FIG. 2, FIG. 2 illustrates an embodiment of the present invention of the hardware configuration of a predictive analytics system 101 (FIG. 1) which is representative of a hardware environment for practicing the present invention. Predictive analytics system 101 may be any type of analytics system (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of identifying optimal weights to improve prediction accuracy in machine learning techniques.

Referring to FIG. 2, predictive analytics system 101 may have a processor 201 connected to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a program for identifying optimal weights to improve prediction accuracy in machine learning techniques as discussed below in connection with FIGS. 3-6.

Referring again to FIG. 2, read-only memory ("ROM") 205 may be connected to system bus 202 and include a basic input/output system ("BIOS") that controls certain basic functions of predictive analytics system 101. Random access memory ("RAM") 206 and disk adapter 207 may also be connected to system bus 202. It should be noted that software components including operating system 203 and application 204 may be loaded into RAM 206, which may be predictive analytics system's 101 main memory for execution. Disk adapter 207 may be an integrated drive electronics ("IDE") adapter that communicates with a disk unit 208, e.g., disk drive. It is noted that the program for identifying optimal weights to improve prediction accuracy in machine learning techniques, as discussed below in connection with FIGS. 3-6, may reside in disk unit 208 or in application 204.

Predictive analytics system 101 may further include a communications adapter 209 connected to bus 202. Communications adapter 209 may interconnect bus 202 with an outside network thereby allowing predictive analytics system 101 to communicate with other devices.

I/O devices may also be connected to predictive analytics system 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to predictive analytics system 101 through keyboard 212 or mouse 213 and receiving output from predictive analytics system 101 via display 215 or speaker 214. Other input mechanisms may be used to input data to predictive analytics system 101 that are not shown in FIG. 2, such as display 215 having touch-screen capability and keyboard 212 being a virtual keyboard. Predictive analytics system 101 of FIG. 2 is not to be limited in scope to the elements depicted in FIG. 2 and may include fewer or additional elements than depicted in FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, achieving better predictive models is an objective in the research and practice of machine learning techniques. For example, ensemble methods use multiple learning algorithms to obtain better predictive performance than could be obtained from any of the constituent learning algorithms alone. Such ensemble methods include bootstrap aggregating (also called bagging), boosting, etc. Bootstrap aggregating is a machine learning ensemble meta-algorithm designed to improve the stability and accuracy of machine learning algorithms used in statistical classification and regression. Boosting is a machine learning ensemble meta-algorithm for primarily reducing bias and also variance in supervised learning and a family of machine learning algorithms that convert weak learners to strong ones. In such techniques, such as boosting, the weights of wrongly classified cases are increased while the weights of correctly classified cases are decreased during the modeling process. Such a strategy (heuristic) does achieve better predictions in many cases; however, overfitting outliers/noises is a possibility. As a result of overfitting outliers/noises, the predictive accuracy is lessened. Hence, the heuristic strategy of increasing the weights of wrongly classified cases and decreasing the weights of correctly classified cases may not be the best strategy for improving the prediction accuracy of the model. For example, sometimes, it may be better to increase the weights of correctly classified cases because such cases contain very important patterns which should be learned by the machine learning algorithm. It may also be better to decrease the weights of wrongly classified cases, such as outlier cases, for similar reasons. Consequently, such techniques, such as boosting, fail to identify the optimal weights for the classified cases, and therefore, fail to achieve optimal prediction accuracy in machine learning techniques.

Figure 3:
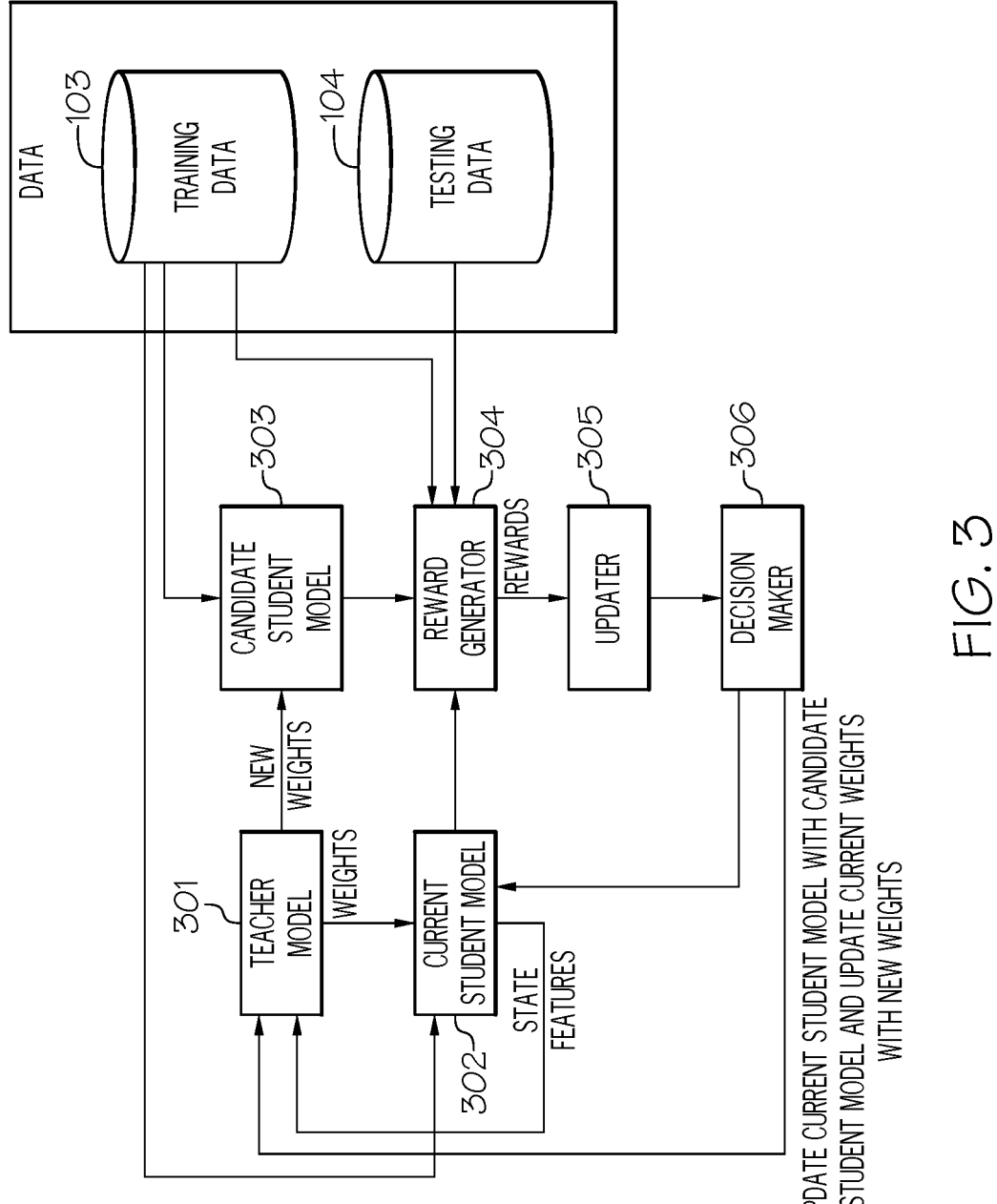
FIG. 3 is a diagram of the software components of the predictive analytics system used to identify the optimal weights to be used by the predictive model for generating predictions in accordance with an embodiment of the present invention.
Figure 4:
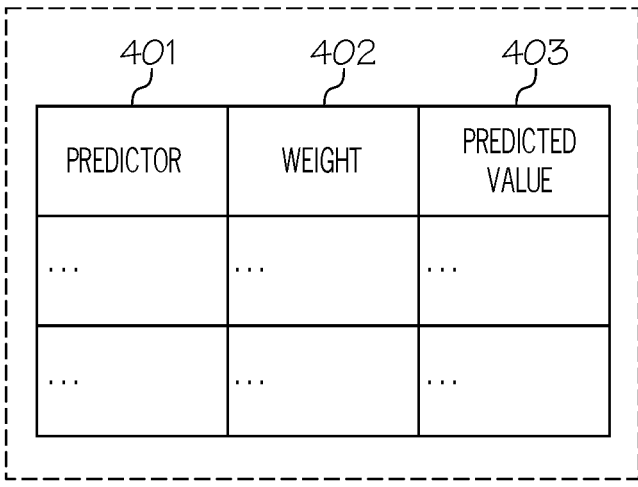
FIG. 4 illustrates the state features generated by the student model in accordance with an embodiment of the present invention.
Figure 5:
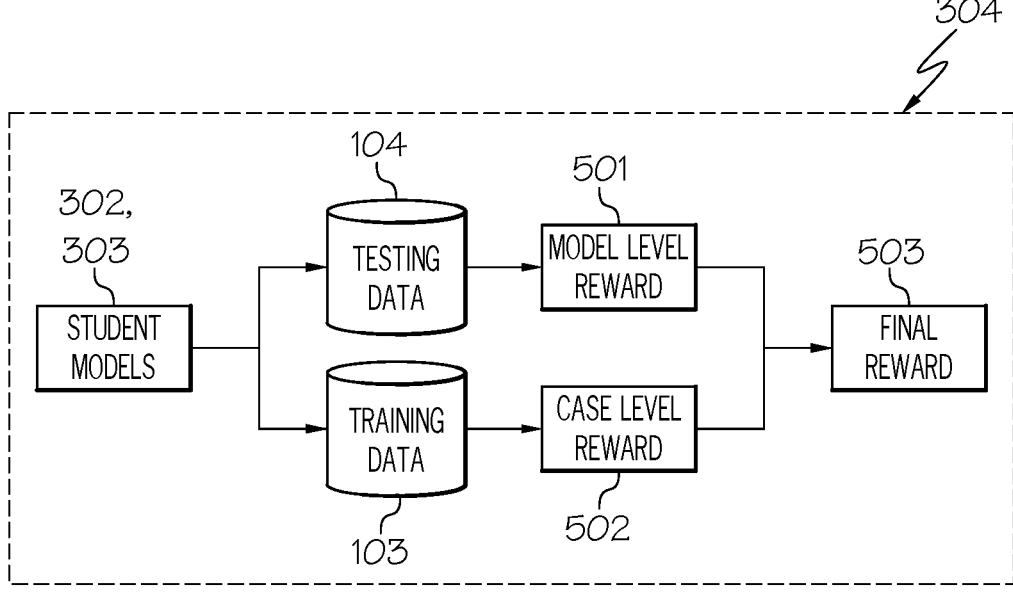
FIG. 5 illustrates the rewards generated by the reward generator in accordance with an embodiment of the present invention.

The embodiments of the present invention provide a means for achieving optimal prediction accuracy in machine learning techniques by identifying the optimal weights using the concept of learning to teach involving two intelligent agents (a teacher model and a student model) as discussed below in connection with FIGS. 3-6. FIG. 3 is a diagram of the software components of predictive analytics system 101 used to identify the optimal weights to be used by the predictive model for generating predictions. FIG. 4 illustrates the state features generated by the student model. FIG. 5 illustrates the rewards generated by the reward generator. FIG. 6 is a flowchart of a method for improving prediction accuracy in machine learning techniques.

Given a training data $\{<X\_k, f\_k, y\_k>|k=1, \ldots, N\}$, where $X\_k$ is a vector of predictors in case k, $y\_k$ is the observed target, and $f\_k$ is an optional case weight (let $f\_k=1$ if no case weight exists), the present invention will generate optimal case weights $f\_k^{opt}$ for each case k. With the optimal case weights, a student model will be trained to provide accurate predictions using the held-out dataset as discussed below.

As stated above, FIG. 3 is a diagram of the software components of predictive analytics system 101 used to identify the optimal weights to be used by the predictive model for generating predictions in accordance with an embodiment of the present invention. In one embodiment, these software components may reside in application 204 (FIG. 2) of predictive analytics system 101.

The following provides a brief description of these software components. A more detailed description of these software components (including their functionalities) is provided below in conjunction with FIGS. 4-6.

Referring to FIG. 3, in conjunction with FIGS. 1-2, predictive analytics system 101 includes a module referred to herein as the "teacher model" 301. In one embodiment, teacher model 301 is a neural network configured to receive state features as inputs and generate a weight for each data case. In one embodiment, the weight parameters of the neural network are initialized randomly before the training process.

Predictive analytics system 101 further includes a module referred to herein as the "current student model 302," which receives the weights generated by teacher model 301 and generates state features, such as those shown in FIG. 4. A "student model," as used herein, refers to a statistical model that is trained to provide a prediction using training data 103. A "current" student model 302, as used herein, refers to a student model currently being trained by predictive analytics system 101 to provide a prediction using training data 103. In one embodiment, student model 302 corresponds to a learner, such as a decision tree or a neural network. In one embodiment, decision tree learning uses a decision tree as a predictive model to go from observations about an item (represented in the branches) to conclusions about the items' target value (represented in the leaves). In one embodiment, a neural network is a network or circuit of neurons (artificial neurons) or nodes.

FIG. 4 illustrates the state features generated by student model 302 in accordance with an embodiment of the present invention.

Referring to FIG. 4, such state features may include predictors 401, their corresponding weight 402 and their predicted value 403. In one embodiment, predictor 401 corresponds to the outcome variable, such as the observed target. Weight 402 corresponds to the weight assigned to such a predictor obtained from teacher model 301. In one embodiment, such weights 402 indicate the confidence that the corresponding predicted value 403 of predictor 401 is accurate. The higher the value, the greater confidence in the corresponding predicted value 403 being correct.

In one embodiment, such state features may also include data features, case weights, student model features and features to represent the combination of both the data and the student model.

In one embodiment, such state features may be utilized by teaching model 301 to generate new weights which are used to train a candidate student model 303. A "candidate student model 303," as used herein, refers to a student model that is being examined to determine if is a better student model (better at predicting the observed target) than the current student model.

In one embodiment, candidate student model 303 is trained by using training data 103 and the new weights generated by teacher model 301.

As illustrated in FIG. 3, a module, referred to herein as the "reward generator 304," generates rewards by comparing the current and candidate student models 302, 303 using training data 103 and testing data 104 ("held-out data"). In one embodiment, teacher model 301 is updated with the rewards. In one embodiment, teacher model 301 utilizes the rewards to update its parameters via policy gradient methods, such as reinforcement learning.

A "reward," as used herein, refers to a value generated by a function (reward function) used in reinforcement learning. The goal of a reinforcement learning agent (predictive analytics system 101) is to collect as much reward as possible. In one embodiment, a positive reward is returned by reward generator 304 if the candidate student model 303 is better at predicting the observed target than the current student model 302. Conversely, a negative reward is returned by reward generator 304 if the current student model 302 is better at predicting the observed target than the candidate student model 303. In one embodiment, reward generator 304 is part of candidate student model 303.

In one embodiment, such rewards are generated by reward generator 304 by applying training data 103, testing data 104 to student models 302, 303 as shown in FIG. 5.

FIG. 5 illustrates the rewards generated by reward generator 304 in accordance with an embodiment of the present invention.

Referring to FIG. 5, reward generator 304 generates a model level reward 501 and a case level reward 502. In one embodiment, model level reward 501 refers to the reward associated with the student models 302, 303 generating a prediction for the observed target based on the testing data 104. For instance, reward 501 is generated based on how much better candidate student model 303 is at predicting the observed target than the current student model 302 using testing data 104. A positive reward 501 is returned by reward generator 304 if the candidate student model 303 is better at predicting the observed target than the current student model 302 using testing data 104. Conversely, a negative reward 501 is returned by reward generator 304 if the current student model 302 is better at predicting the observed target than the candidate student model 303 using testing data 104.

Case level reward 502 refers to the reward based on correctly classifying the data case by student models 302, 303 using training data 103. If student model 302, 303 correctly classified the data case, then a positive reward 502 is returned by reward generator 304. Conversely, a negative reward 502 is returned by reward generator 304 if student model 302, 303 did not correctly classify the data case.

In one embodiment, reward generator 304 generates a final reward 503 that is a combination of model level reward 501 and case level reward 502, such an average of the two rewards.

Returning to FIG. 3, utilizing the rewards, a module, referred to herein as the "updater 305," updates teacher model 301 with the reward. In one embodiment, teacher model 301 faces an associative immediate-reinforcement learning task. Suppose that the reward for the reinforcement value is r at each trial, then the parameter w_ij in the network is incremented by an amount $\Delta w\_ij = \Sigma\_{(k=1)}^{N} \alpha(\partial \ln g\_k)/$ $(\partial w\_ij)r\rbrack$, where a is a learning rate factor, N is a positive integer number, and g_k is the output of the teacher model for case k.

Once teacher model 301 is updated, a determination is made by decision maker 306 as to whether candidate student model 303 is a better predictor of the observed target than the current student model 302 or not. In one embodiment, if candidate student model 303 is better at predicting the observed target than current student model 302, then decision maker 306 will update current student model 302 with candidate student model 303 as well as update the current weights with the new weights. The updated student model 302 will then generate new state features which are inputted to teacher model 301.

Alternatively, if candidate student model 303 is not better at predicting the observed target than current student model 302, then decision maker 306 directly requests the updated teacher model 301 (updated with the rewards as discussed above) to generate new weights using the current student features from the current student model 302.

A more detailed discussion regarding the process of improving prediction accuracy in machine learning techniques using the software components discussed above is provided below in connection with FIG. 6.

FIG. 6 is a flowchart of a method 600 for improving prediction accuracy in machine learning techniques in accordance with an embodiment of the present invention.

Referring to FIG. 6, in conjunction with FIGS. 1-5, in step 601, predictive analytics system 101 constructs a teacher model 301 which generates a weight for each data case. A "teacher model," as used herein, refers to a statistical model that determines the appropriate data, loss function and hypothesis space to facilitate the learning of the student model. In one embodiment, teacher model 301 is a neural network. In one embodiment, teacher model 301 receives state features from current student model 302 as inputs and generates a weight for each data case. A "data case," as used herein, refers to data used to predict an observed target. In one embodiment, the weight parameters are initialized randomly before the training process begins (discussed further below).

In one embodiment, teacher model 301 includes networks composed of several layers. In one embodiment, the layers are made of nodes, where a node is a place where computation happens, loosely patterned on a neuron in the human brain, which fires when it encounters sufficient stimuli. A node combines input from the data, such as state features (discussed further below) from current student model 302 with a set of coefficients, or weights, that either amplify or dampen that input, thereby assigning significance to inputs with regard to the task the algorithm is trying to learn (e.g., which input is most helpful in classifying data without error). These input-weight products are summed and then the sum is passed through a node's so-called activation function, to determine whether and to what extent that signal should progress further through the network to affect the ultimate outcome (e.g., an act of classification). If the signals pass through, the neuron has been "activated."

In one embodiment, a node layer is a row of neuron-like switches that turn on or off as the input is fed through the net. Each layer's output is simultaneously the subsequent layer's input, starting from an initial input layer receiving the data.

In one embodiment, the model's adjustable weights are paired with the input features so as to assign significance to those features with regard to how the neural network classifies and clusters input.

In one embodiment, such generated weights can be used to correct the distribution of data cases in training data 103 in the event that training data 103 comes from a biased sampling.

In step 602, predictive analytics system 101 trains current student model 302 using training data 103 and weights (current weight for each data case) generated by teacher model 301. As previously discussed, current student model 302 refers to a student model (statistical model that is trained to provide a prediction, such as predicting the observed target, using training data) that is currently being trained by predictive analytics system 101 to provide a prediction using training data 103. As also previously discussed, in one embodiment, current student model 302 corresponds to a learner, such as a decision tree or a neural network. In one embodiment, decision tree learning uses a decision tree as a predictive model to go from observations about an item (represented in the branches) to conclusions about the items' target value (represented in the leaves). In one embodiment, a neural network is a network or circuit of neurons (artificial neurons) or nodes.

In one embodiment, case weights are used as actions on current student model 302 (as well as on candidate student model 303 discussed further below). Such a method allows the usage of any type of machine learner as the student model (student models 302, 303) given that the learner supports case weight in training.

In one embodiment, such training involves fitting current student model 302 on a training dataset 103, that is a set of examples used to fit the parameters, such as the weights generated by teacher model 301. In one embodiment, current student model 302 is trained using a supervised learning method (e.g., gradient descent or stochastic gradient descent). In one embodiment, training dataset 103 consists of pairs of input vectors (or scalar) and the corresponding output vector (or scalar), which may be denoted as the target. Current student model 302 is run with training dataset 103 and produces a result, which is then compared with the target, for each input vector in training dataset 103. Based on the result of the comparison and the specific learning algorithm being used, the parameters of student model 302 are adjusted.

In step 603, after training current student model 302, the trained current student model 302 generates state features. In one embodiment, state features are defined for each data case based on current student model 302. State features may include, but not limited to, data features containing information for a data case, such as its predictors, target, etc.; case weight generated by teacher model 301; student model features, including the measures reflecting how well current student model 302 is trained; and features to represent the combination of both data and student model 302, such as predicted targets, probabilities of each target category, etc.

In one embodiment, case-level state features are also generated by student model 302, including the corresponding case weight.

In one embodiment, current student model 302 generates data that includes the previously discussed state features. Such features are generated using a set of statistical assumptions based on the receiving training data 103 and weights from teacher model 301.

In step 604, teacher model 301 generates new weights using the state features generated by current student model 302. In one embodiment, such state features are input to teacher model 301 which are used to generate weights by teacher model 301 as discussed above.

In step 605, predictive analytics system 101 trains a candidate student model 303 using training data 103 and the new weights generated by teacher model 301. In one embodiment, training candidate student model 303 is performed in the same manner as training current student model 302 as discussed above in connection with step 602.

In step 606, reward generator 304 generates a reward by comparing the current and candidate student models 302, 303 (after training student models 302, 303) using training data 103 and testing data 104 ("held-out data") to determine which is better at predicting an observed target. A "reward," as used herein, refers to a value generated by a function (reward function) used in reinforcement learning. The goal of a reinforcement learning agent (predictive analytics system 101) is to collect as much reward as possible. In one embodiment, a positive model level reward 501 is returned by reward generator 304 if the candidate student model 303 is better at predicting the observed target than the current student model 302 using testing data 104. Conversely, a negative model level reward 501 is returned by reward generator 304 if the current student model 302 is better at predicting the observed target than the candidate student model 303 using testing data 104.

Case level reward 502 refers to the reward based on correctly classifying the data case by student models 302, 303 using training data 103. If student model 302, 303 correctly classified the data case, then a positive reward 502 is returned by reward generator 304. Conversely, a negative reward 502 is returned by reward generator 304 if student model 302, 303 did not correctly classify the data case.

In one embodiment, reward generator 304 generates a final reward 503 that is a combination of model level reward 501 and case level reward 502, such an average of the two rewards.

In step 607, a determination is made by predictive analytics system 101 as to whether a stopping rule has been satisfied. "Stopping rules," as used herein, refer to the rules that determine whether the training of a student model has been completed. Such training is completed when it has been determined that the optimal weights for the data cases have been identified.

In one embodiment, such stopping rules include, but not limited to, the following: reaching a specified number of trials, reaching a specified training timing, converging of a prediction accuracy and a user-initiated termination.

If any of these stopping rules have been satisfied, then, in step 608, the optimal weights (weights generated by teacher model 301) and the corresponding student model 302 are returned to the user, such as via a user interface on predictive analytics system 101. The returned student model is able to provide an accurate prediction of the observed target. Furthermore, the returned weights, which are generated by teacher model 301 (see step 604), are deemed to be the "optimal" weights, such as when a stopping rule has been satisfied (e.g., when the prediction accuracy converges). In this manner, optimal weights are identified to improve prediction accuracy.

If, however, none of the stopping rules have been satisfied, then, in step 609, updater 305 updates teacher model 301 with the reward (reward of step 606). In one embodiment, teacher model 301 utilizes the rewards to update its parameters via policy gradient methods, such as reinforcement learning.

As previously discussed, in one embodiment, teacher model 301 faces an associative immediate-reinforcement learning task. Suppose that the reward for the reinforcement value is r at each trial, then the parameter w_ij in the network is incremented by an amount $\Delta w\_ij = \Sigma(k=1)^{N} \alpha(\partial lng\_k)/(\partial w\_ij)r$, where $\alpha$ is a learning rate factor, N is a positive integer number, and g_k is the output of the teacher model for case k. The incremented amount $\Delta w$ upon which teacher model 301 will be updated may also be shown as follows:

$$\Delta w_{ij} = \alpha r^{model} \sum_{k=1}^{N} \frac{\partial \ln g_k}{\partial w_{ij}} r_k^{case}$$

where r is the reinforcement value at each trial, $w_{ij}$ is a parameter in the network incremented by an amount $\Delta w_{ij}$, $\alpha$ is a learning rate factor, N is a positive integer number, and $g_k$ is the output of the teacher model for case k.

Upon updating teacher model 301, in step 610, a determination is made by decision maker 306 as to whether candidate student model 303 generates a better prediction of the observed target than current student model 302. Such a determination is based on how close the prediction is to the observed target.

If candidate student model 303 is better at predicting the observed target than current student model 302, then, in step 611, current student model 302 is updated with candidate student model 303. That is, in step 611, current student model 302 is essentially replaced with candidate student model 303.

Furthermore, if candidate student model 303 is better at predicting the observed target than current student model 302, then in step 612, the current weights are updated with the new weights (new weights generated by teacher model 301 in step 604).

Upon updating the current weights with the new weights, the updated student model 302 (updated in step 611) generates state features in step 603 using the new weights.

Alternatively, if candidate student model 303 is not better at predicting the observed target than current student model 302, then decision maker 306 directly requests the updated teacher model 301 (updated in step 609) to generate new weights in step 604 using the current student features from the current student model 302 and current weights.

In this manner, the present invention devises a framework which implements the concept of "learning to teach" in the field of predictive modeling. Such a framework includes a teacher model, which generates a weight for each data case. The training data cases, along with the generated weights, are used to re-train the student model. A reward is returned by evaluating the trained student model on a held-out dataset in terms of prediction accuracy. The teacher model then utilizes the reward to update its parameters via policy gradient methods, e.g., reinforcement learning. Such a process will be repeated until the student model achieves desired performance.

In comparison to previously used heuristic methods (e.g., boosting), the approach of the present invention determines case weights in an optimal way. This allows one to build a better student model via basic learners, e.g., decision tree, neural network, etc., rather than using an ensemble model.

By using case weights as actions on the student model, any type of machine learner may be used as the student model given that the learner supports case weight in training.

Furthermore, the present invention improves the technology or technical field involving predictive modeling. As discussed above, achieving better predictive models is an objective in the research and practice of machine learning techniques. For example, ensemble methods use multiple learning algorithms to obtain better predictive performance than could be obtained from any of the constituent learning algorithms alone. Such ensemble methods include bootstrap aggregating (also called bagging), boosting, etc. Bootstrap aggregating is a machine learning ensemble meta-algorithm designed to improve the stability and accuracy of machine learning algorithms used in statistical classification and regression. Boosting is a machine learning ensemble meta-algorithm for primarily reducing bias and also variance in supervised learning and a family of machine learning algorithms that convert weak learners to strong ones. In such techniques, such as boosting, the weights of wrongly classified cases are increased while the weights of correctly classified cases are decreased during the modeling process. Such a strategy (heuristic) does achieve better predictions in many cases; however, overfitting outliers/noises is a possibility. As a result of overfitting outliers/noises, the predictive accuracy is lessened. Hence, the heuristic strategy of increasing the weights of wrongly classified cases and decreasing the weights of correctly classified cases may not be the best strategy for improving the prediction accuracy of the model. For example, sometimes, it may be better to increase the weights of correctly classified cases because such cases contain very important patterns which should be learned by the machine learning algorithm. It may also be better to decrease the weights of wrongly classified cases, such as outlier cases, for similar reasons. Consequently, such techniques, such as boosting, fail to identify the optimal weights for the classified cases, and therefore, fail to achieve optimal prediction accuracy in machine learning techniques.

The present invention improves such technology by constructing a teacher model, where the teacher model generates a weight for each data case. A "teacher model," as used herein, refers to a statistical model that determines the appropriate data, loss function and hypothesis space to facilitate the learning of the student model. The current student model is then trained using training data and the weights generated by the teacher model. A "student model," as used herein, refers to a statistical model that is trained to provide a prediction using training data. A "current" student model, as used herein, refers to a student model currently being trained to provide a prediction using training data. The current student model generates state features (e.g., data features, case weights, student model features and features to represent the combination of both the data and the student model), which are used by the teacher model to generate new weights. A candidate student model is then trained using training data and these new weights. A "candidate student model," as used herein, refers to a student model that is being examined to determine if is a better student model (better at predicting the observed target) than the current student model. A reward is then generated by comparing the current student model with the candidate student model using training and testing data to determine which is better at predicting an observed target. A "reward," as used herein, refers to a value generated by a function (reward function) used in reinforcement learning. A positive reward may be returned if the candidate student model is better at predicting the observed target than the current student model. Conversely, a negative reward may be returned if the current student model is better at predicting the observed target than the candidate student model. The teacher model is then updated with the reward. The teacher model utilizes the rewards to update its parameters via policy gradient methods, such as reinforcement learning. If the candidate student model is better at predicting the observed target than the current student model, then the current student model is updated with the candidate student model and the current weights are updated with the new weights generated by the teacher model. Upon updating the current weights with the new weights, the current student model generates new state features. If, however, the candidate student model is not better at predicting the observed target than the current student model, then the updated teacher model generates new weights using the current weights and the current student features from the current student model. Upon any of the stopping rules being satisfied (e.g., reaching a specified number of trials, reaching a specified training timing, converging of a prediction accuracy and a user-initiated termination), the weights generated by the teacher model are deemed to be the "optimal" weights which are returned to the user along with the corresponding student model. In this manner, optimal weights are identified to improve prediction accuracy. Furthermore, in this manner, there is an improvement in the technical field of predictive modeling.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

In one embodiment of the present invention, a computer-implemented method for improving prediction accuracy in machine learning techniques comprises training a current student model using training data and weights generated by a teacher model. The method further comprises generating new weights by the teacher model using state features. The method additionally comprises training a candidate student model using the training data and the new weights. Furthermore, the method comprises generating a reward by comparing the current student model with the candidate student model using the training data and testing data to determine which is better at predicting an observed target. Additionally, the method comprises returning the new weights and the current student model to a user in response to a stopping rule being satisfied, where the returned student model provides a prediction of the observed target.

In one embodiment of the present invention, the method further comprises determining whether the candidate student model generates a better prediction of the observed target than the current student model based on how close the prediction is to the observed target.

In one embodiment, the method further comprises updating the current student model with the candidate student model and updating current weights with the new weights in response to the candidate student model generating a better prediction of the observed target than the current student model.

In one embodiment, the method additionally comprises updating the teacher model with the reward in response to a stopping rule not being satisfied.

Furthermore, in one embodiment, the method additionally comprises generating a second set of new weights by the updated teacher model using the state features in response to the candidate student model not generating a better prediction of the observed target than the current student model.

Additionally, in one embodiment, the method further comprises training the candidate student model using the training data and the second set of new weights.

In one embodiment, the method further comprises having the stopping rule comprise one or more of the following:

reaching a specified number of trials, reaching a specified training time, converging of a prediction accuracy, and a user-initiated termination.

Other forms of the embodiments of the method described above are in a system and in a computer program product.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving prediction accuracy in machine learning techniques, the computer-implemented method comprising:

training a candidate student model using training data and weights generated by a teacher model;

comparing a current student model with the candidate student model using the training data and testing data to determine which is better at predicting an observed target;

determining whether the candidate student model is better at predicting the observed target than the current student model based on how close predictions generated by the candidate student model are to the observed target; and in response to determining that the candidate student model is better at predicting the observed target than the current student model, updating the current student model with the candidate student model and updating current weights with the weights.

2. The computer-implemented method of claim 1, further comprising:

training the current student model using the training data and a current weight for each data case generated by the teacher model;

generating a reward based on the comparing the current student model with the candidate student model; and updating the teacher model with the reward in response to a stopping rule not being satisfied.

3. The computer-implemented method of claim 2, further comprising:

prior to the updating the teacher model, generating the weights by the teacher model using state features; and subsequent to the updating the teacher model, generating a set of weights by the updated teacher model using the state features in response to determining that the candidate student model is not better at predicting the observed target than the current student model.

4. The computer-implemented method of claim 3, further comprising:

training the candidate student model using the training data and the set of weights.

5. The computer-implemented method of claim 3, wherein the state features comprise one or more of data features, case weights, student model features, or features representing a combination of data and the current student model.

6. The computer-implemented method of claim 1, further comprising:

returning the weights and the current student model to a user in response to a stopping rule being satisfied, wherein the returned current student model provides a prediction of the observed target, and wherein the stopping rule comprises one or more of: reaching a specified number of trials, reaching a specified training time, converging of a prediction accuracy, or a user-initiated termination.

7. The computer-implemented method of claim 1, wherein the weights are generated by the teacher model using reinforcement learning techniques.

8. A computer program product for improving prediction accuracy in machine learning techniques, the computer program product comprising one or more computer readable storage mediums having program code embodied therewith, the program code comprising programming instructions for:

training a candidate student model using training data and weights generated by a teacher model;

comparing a current student model with the candidate student model using the training data and testing data to determine which is better at predicting an observed target;

determining whether the candidate student model is better at predicting the observed target than the current student model based on how close predictions generated by the candidate student model are to the observed target; and in response to determining that the candidate student model is better at predicting the observed target than the current student model, updating the current student model with the candidate student model and updating current weights with the weights.

9. The computer program product of claim 8, wherein the programming instructions are further for:

training the current student model using the training data and a current weight for each data case generated by the teacher model;

generating a reward based on the comparing the current student model with the candidate student model; and updating the teacher model with the reward in response to a stopping rule not being satisfied.

10. The computer program product of claim 9, wherein the programming instructions are further for:

prior to the updating the teacher model, generating the weights by the teacher model using state features; and subsequent to the updating the teacher model, generating a set of weights by the updated teacher model using the state features in response to determining that the candidate student model is not better at predicting the observed target than the current student model.

11. The computer program product of claim 10, wherein the programming instructions are further for:

training the candidate student model using the training data and the set of weights.

12. The computer program product of claim 10, wherein the state features comprise one or more of data features, case weights, student model features, or features representing a combination of data and the current student model.

13. The computer program product of claim 8, wherein the programming instructions are further for:

returning the weights and the current student model to a user in response to a stopping rule being satisfied, wherein the returned current student model provides a prediction of the observed target, and wherein the stopping rule comprises one or more of the following: reaching a specified number of trials, reaching a specified training time, converging of a prediction accuracy, and a user-initiated termination.

14. The computer program product of claim 8, wherein the weights are generated by the teacher model using reinforcement learning techniques.

15. A system, comprising:

a memory for storing a computer program for improving prediction accuracy in machine learning techniques; and a processor connected to the memory, wherein the processor is configured to execute program instructions of the computer program comprising:

training a candidate student model using training data and weights generated by a teacher model;

comparing the current student model with the candidate student model using the training data and testing data to determine which is better at predicting an observed target;

determining whether the candidate student model is better at predicting the observed target than the current student model based on how close predictions generated by the candidate student model are to the observed target; and in response to determining that the candidate student model is better at predicting the observed target than the current student model, updating the current student model with the candidate student model and updating current weights with the weights.

16. The system as recited in claim 15, wherein the program instructions of the computer program further comprise:

training the current student model using the training data and a current weight for each data case generated by the teacher model;

generating a reward based on the comparing the current student model with the candidate student model; and updating the teacher model with the reward in response to a stopping rule not being satisfied.

17. The system of claim 16, wherein the program instructions of the computer program further comprise:

prior to the updating the teacher model, generating the weights by the teacher model using state features; and subsequent to the updating the teacher model, generating a set of weights by the updated teacher model using the state features in response to determining that the candidate student model is not better at predicting the observed target than the current student model.

18. The system of claim 17, wherein the program instructions of the computer program further comprise:

training the candidate student model using the training data and the set of weights.

19. The system of claim 15, wherein the program instructions of the computer program further comprise:

returning the weights and the current student model to a user in response to a stopping rule being satisfied, wherein the returned current student model provides a prediction of the observed target, and wherein the stopping rule comprises one or more of: reaching a specified number of trials, reaching a specified training time, converging of a prediction accuracy, or a user-initiated termination.

20. The system of claim 17, wherein the state features comprise one or more of data features, case weights, student model features, or features representing a combination of data and the current student model.

\* \* \* \* \*